(12) United States Patent
Lipovski

(10) Patent No.: US 7,363,042 B2
(45) Date of Patent: Apr. 22, 2008

(54) CELL PHONE MUTING OVERRIDE SYSTEM

(76) Inventor: G. Jack Lipovski, 15017 Calaveras Dr., Austin, TX (US) 78717

( * ) Notice: Subject to any disclaimer, the term of this patent is extended or adjusted under 35 U.S.C. 154(b) by 0 days.

(21) Appl. No.: 11/511,723

(22) Filed: Aug. 29, 2006

(65) Prior Publication Data

US 2007/0049264 A1    Mar. 1, 2007

Related U.S. Application Data

(63) Continuation of application No. 10/687,024, filed on Oct. 16, 2003, now Pat. No. 7,142,877, which is a continuation of application No. 09/384,723, filed on Aug. 27, 1999, now Pat. No. 6,675,002.

(51) Int. Cl.
*H04Q 7/20* (2006.01)

(52) U.S. Cl. .................. 455/456.4; 455/421; 455/456.1

(58) Field of Classification Search ............. 455/194.1, 455/212, 219, 456.1, 456.4, 458, 567, 421, 455/422.1, 465
See application file for complete search history.

(56) References Cited

U.S. PATENT DOCUMENTS

| | | |
|---|---|---|
| 3,944,982 A | 3/1976 | Mogi et al. |
| 5,014,294 A | 5/1991 | Kromenaker et al. |
| 5,058,205 A | 10/1991 | Roehrs et al. |
| 5,287,549 A | 2/1994 | Roehrs et al. |
| 5,369,690 A | 11/1994 | Comfort |
| 5,604,797 A | 2/1997 | Adcock |
| 5,802,467 A | 9/1998 | Salazar et al. |
| 5,926,756 A | 7/1999 | Piosenka et al. |
| 6,195,557 B1 * | 2/2001 | Havinis et al. ........... 455/456.2 |
| 6,400,814 B1 | 6/2002 | Adams |
| 6,438,385 B1 | 8/2002 | Heinonen et al. |
| 6,625,455 B1 * | 9/2003 | Ariga ...................... 455/456.1 |
| 6,754,486 B2 | 6/2004 | Cox et al. |
| 6,832,093 B1 | 12/2004 | Ranta |
| 7,079,851 B2 | 7/2006 | Makuta |

* cited by examiner

*Primary Examiner*—CongVan Tran

(57) ABSTRACT

The disclosed invention relates to a system for restricting radio frequency transmissions within a restricted area and more particularly to a mechanism for overriding the restriction of radio frequency transmissions within a restricted area using an override mechanism. A restricted area is defined wherein all radio frequency transmissions are restricted. Within the restricted a plurality of cellular telephones is disposed, each with a radio frequency transmitter and a radio frequency receiver. An emergency override is also disposed within the restricted area, the emergency override capable of selectively enabling communications of a selected subset of the cellular telephones disposed within the restricted area.

18 Claims, 3 Drawing Sheets

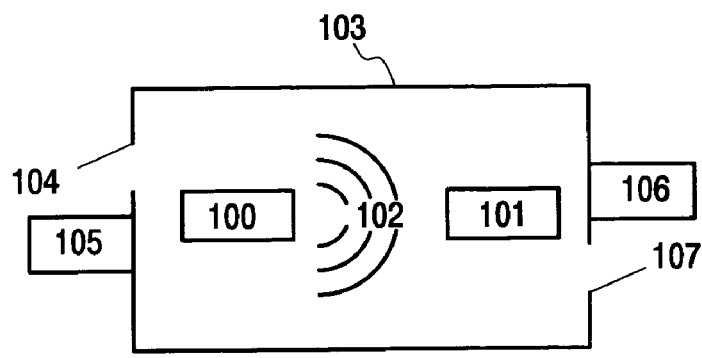
Fig. 1
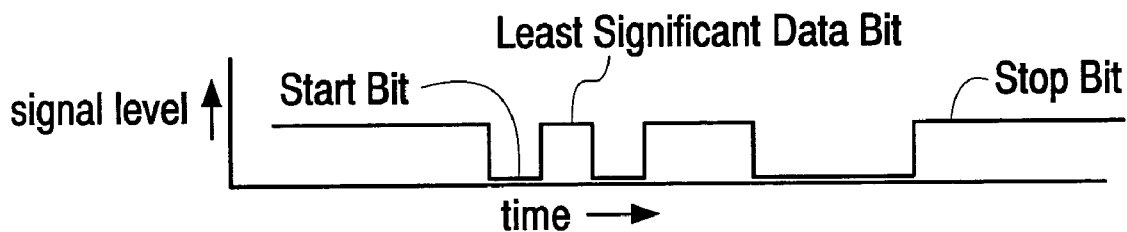
Fig. 2
Fig. 3
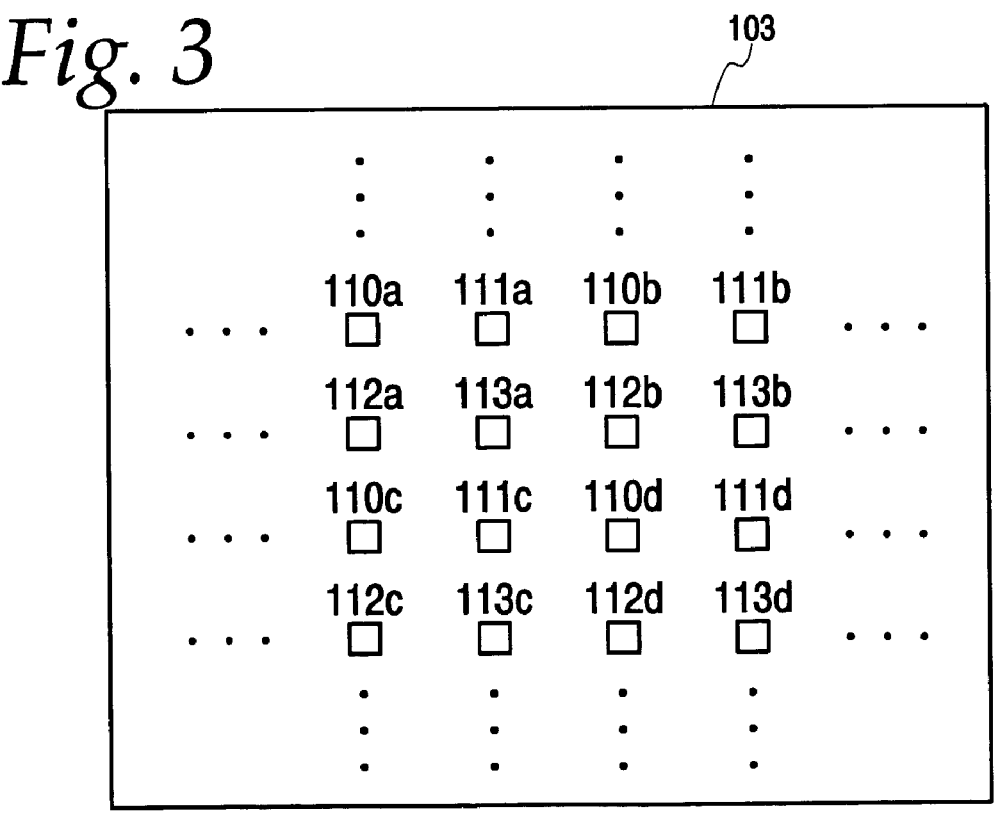

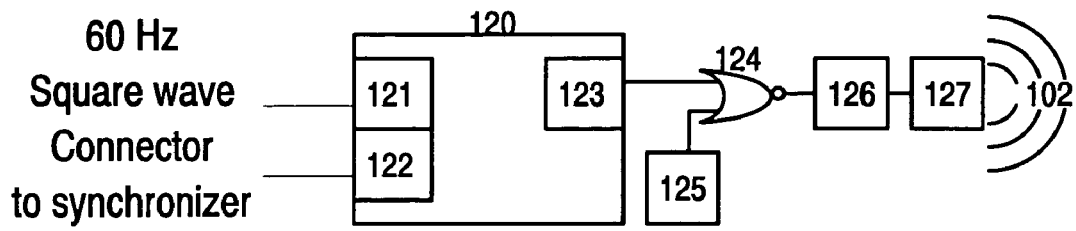

*Fig. 4* volatile unsigned short EPDDR@0x10007002, EPDR@0x10007004, U0RX@0x10009000, U0TX@0x10009040, U0CR1@0x10009080, U0CR2@0x10009082 U0BRGR@0x10009084, U0SR@0x10009086, U0PCR@0x1000908A, EPPAR@0x10007000, EPFR@0x10007006;  ⸺129 enum{ UART_EN = 1, TXEN = 0x1000, RXEN = 0x100, IRTS = 0x4000, WS = 0x20, TRDY = 0x2000, RRDY = 0x100};  ⸺130

*Fig. 5*

```
void init() {                                    131
    U0BRGR=3333; /*600 baud if system clock is 32 MHz */    132
    U0PCR=2; // Txd pins used by UART0
    U0CR1=UART_EN + TXEN; // enable UART transmitter
    U0CR2=IRTS + WS; //disable hardware RTS control, have 8-bit data frame
    EPPAR=5; // make both inputs rising edge sensitive     133
}
void put() {short i; static char count;          134
    if((((i=EPFR) & 1 == 0) return;              135
    EPFR=i; if(i & 2) count=0;                   136
    if((((count++)& 3) == 0) && (U0SR & TRDY)) U0TX=0x8d;   137
}
```

*Fig. 6*

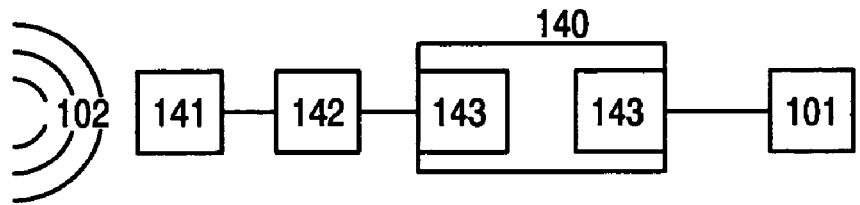

Fig. 7

```
                      /—150
void init() {
    U0BRGR=3333; /*600 baud if system clock is 32 MHz */——151
    U0PCR=1; // Rxd used by UART0
    U0CR1=UART_EN + RXEN; // enable UART receiver
    U0CR2=IRTS + WS; //disable hardware RTS control, have 8-bit data frame
    EPDDR=1; // make port bit 0 an output
}                                                    —152 void check() {short i; 0, j;——153
    while(U0SR & RRDY) {——154
        if((j = U0RX) & 0x4000);——155
        else if (j = = 0x8d) i = 1 ; // output 1 to mute device——156
        else if (j = = 0xae) timeout = N ; // mute for next 3 hours——157
        else if (j = = 0xe6) timeout = 0 ; // cancel mute timeout——158
    }                                          —159
    if(timeout) i = 0; //——160
    EPDR = i; // output chosen value——161
}
```

Fig. 8

CELL PHONE MUTING OVERRIDE SYSTEM

RELATED APPLICATIONS

This application is a continuation of U.S. patent application Ser. No. 10/687,024, filed Oct. 16, 2003 now U.S. Pat. No. 7,142,877, which is a continuation of U.S. patent application Ser. No. 09/384,723, filed Aug. 27, 1999, now U.S. Pat. No. 6,675,002.

FIELD OF THE INVENTION

This invention is in the field of automatically muting electronic devices that emit sound or radio frequency signals, where muting means inhibiting generation or reproduction of objectionable electronic sound or radio-signals, or reducing such sound or radio-signals to an acceptable level.

DESCRIPTION OF THE PRIOR ART

People attending a concert, or similar event, are distracted and irritated when cellular telephones and pagers ring. During a quiet and delicate passage, a musician can be distracted by a ringing cell phone, stopping the performance. Attendees at churches, synagogues, lecture halls, and even restaurants are similarly distracted by cellular telephones, pagers, wrist watches, and other electronic devices that reproduce or generate audio signals. Cell phones should not be used in airplanes. However, individuals do not have the courtesy to turn these devices off, or at least, mute them, when they might distract others or interfere with navigation.

Nevertheless, it is possible to automatically mute these devices by making a signal present in the concert hall, or similar area (restricted area), or through entrances or exits to these areas, which can be received by the offending device (restricted device). This inventive apparatus will automatically mute all restricted devices in restricted areas, provided that restricted areas, or entrances to, and possibly exits from, the areas are equipped with a transmitter apparatus, and all restricted devices are fitted with a receiver apparatus, according to this invention.

OBJECTS OF THE INVENTION

Accordingly, it is an objective of this invention to disable the operation of a cellular telephone or other mobile communications device in the vicinity of "high value" areas.

SUMMARY OF THE INVENTION

Accordingly, the disclosed invention relates to a system for restricting radio frequency transmissions within a restricted area including a mechanism for overriding the restriction of radio frequency transmissions within the restricted area. Through some means, a restricted area is defined wherein all radio frequency transmissions are restricted. A cellular telephone is disposed within the restricted area, the cellular telephone including a radio frequency transmitter and a radio frequency receiver. An emergency override mechanism is also disposed within the restricted area, the emergency override capable of selectively enabling communications of a selected subset of the cellular telephones disposed within the restricted area.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a top plan view of the general organization of the system constructed in accordance with the general principles of the present invention.

FIG. 2 is a description of a control signal sent from transmitter to receiver.

FIG. 3 is a description of a layout of multiple transmitters to cover a large restricted area.

FIG. 4 is a preferred embodiment design of a transmitter.

FIG. 5 is a C language declaration of ports used in FIG. 6 and FIG. 8.

FIG. 6 is a pair of C language procedures executed in the transmitter.

FIG. 7 is a preferred embodiment design of a receiver.

FIG. 8 is a pair of C language procedures executed in the receiver.

DETAILED DESCRIPTION OF THE ILLUSTRATED EMBODIMENT

A high-level view of the operation of this apparatus is presented first. Then a concrete design of a preferred embodiment is presented later.

FIG. 1 illustrates the general organization of this apparatus. A restricted area 103 may be protected by one of three operating modes or a combination thereof. In a first mode, the restricted area has one or more control signal transmitters 100, and one or more restricted devices 101 may be carried by persons in the area. The control signal 102 passes throughout (blankets) the restricted area 103. Whenever restricted device 101 receives the control signal 102, it will be muted. Alternatively in a second operating mode, a first control signal transmitter 105 may be placed by each entrance 104 to a restricted area 103, and a second control signal transmitter 106 may be placed by each exit 107 from a restricted area 103. When a restricted device 101 receives a control signal from first control signal transmitter 105, it is muted until the restricted device 101 receives a control signal from second control signal transmitter 106. In a variation of this mode, for instance in an airport jetway, a second control signal is emitted near the airport terminus of the jetway, and the first control signal is emitted near the airplane terminus of the jetway. As a restricted device passes through the jetway into an airplane, the last-met signal mutes the device before it enters the airplane, and as a restricted device passes through the jetway out of an airplane, the last-met signal restores the device to the non-muted state before it enters the airport. Finally, in a third operating mode, a control signal transmitter 105 may be placed by each entrance 104 to a restricted area 103. Upon receipt of a control signal from control signal transmitter 105, a restricted device 101 is muted for a period of time, such as three hours.

In this preferred embodiment, essentially the same hardware is used for all three modes to reduce cost. The preferred control signal is ultrasound, because in an area-blanketing mode, this signal should have radiation coverage that is similar to the objectionable sound that it mutes, but must not be objectionable itself. But without departing from the spirit of this invention, any combination of the aforementioned modes may be implemented, each mode may use different hardware, or the control signal can be a limited-range radio wave, infrared signal, or other local signal that can broadcast over the entire restricted area, possibly by using multiple transmitters in the restricted area, and not broadcast significantly, or be present coincidentally, beyond this area.

The ultrasonic signal should be an unusual pattern of ultrasonic bursts. Otherwise devices like ultrasonic pest deterrents and ultrasonic distance measurement devices, which emit continuous ultrasonic energy, or simple repetitions of ultrasonic energy, might be used in nonrestrictive areas. Such ultrasonic transmitters should not accidentally mute restricted devices. Restricted electronic devices are generally controlled by microcontrollers. Most microcontrollers have at least one UART (Universal Asynchronous Receiver-Transmitter (or equivalent) module), or if not, many such UART modules are already designed and can be inexpensively included in the design of a special microcontroller used in restricted devices. Therefore the ultrasonic signal should be modulated by a communication frame (or packet) signal that is sent and that will be received by UARTs. This preferred embodiment will utilize three UART frames sent at 600 baud, having no parity bit and one stop bit, which (1) have binary pattern 10001101 or hexadecimal pattern in C notation, 0x8d (FIG. 2 shows such a signal at output RxD 123 in FIG. 4), (2) have binary pattern 10101110 or hexadecimal pattern 0xae, or (3) have binary pattern 11100110 or hexadecimal pattern 0xe6; each frame has a variation of single bit-wide pulses, and multiple bit-wide pulses, which is unlikely to appear in patterns generated by naturally occurring sources or in use for other communication or control applications. However, another communication frame structure, or a signal not presently used for communication, can be used without departing from the spirit of this invention.

The following discussion pertains mainly to area blanketing transmitters 100. A pattern frame from transmitter 100 should be sent repetitively, but no signal should be sent for multiple frame times, so that if a plurality of transmitters are needed to cover a restricted area, different transmitters can transmit their frame at different times without interfering with other transmitters. This should be done so that a restricted device will receive a frame from at least one of the transmitters without interference from another transmitter that might cancel the signal. Further, if a signal is sent from a transmitter, and if interference from a reflected signal from the same transmitter cancels its signal, the restricted device should be able to receive a frame from another transmitter without it being cancelled. In this preferred embodiment, a frame is sent every four frame times by one transmitter. If a large number of transmitters are needed to cover a restricted area, transmitters can be arranged in a repetitive two-dimensional array pattern as shown in FIG. 3, where for purposes of description, transmitters are arranged in rows numbered consecutively from top to bottom, and in columns numbered consecutively from left to right. The transmitters will be synchronized to insure that any restricted device in the restricted area will receive at least one signal without cancellation by a signal sent by another transmitter. Each transmitter will send its frame in a time slot, and repeated each four time slots after that. A transmitter (110*a*, 110*b*, . . . ) in an even numbered row and even numbered column will send its frame in a frame time slot zero. A transmitter (111*a*, 111*b*, . . . ) in an even numbered row and odd numbered column will send its frame in a frame time slot one. A transmitter (112*a*, 112*b*, . . . ) in an odd numbered row and even numbered column will send its frame in a frame time slot two. A transmitter (113*a*, 113*b*, . . . ) in an odd numbered row and odd numbered column will send its frame in a frame time slot three. In the restricted area, any restricted device, receiving a signal from two different transmitters that might interfere with each other, will receive a signal from some other transmitter. This transmitter will be much closer to the receiver than any other transmitter that is sending a signal in the same frame time slot. Thus, a restricted device will receive a frame from at least one transmitter, without risk of cancellation by a signal from another transmitter. A control signal received from any transmitter will mute the restricted device for a time that is at least as long as the time between signals from that transmitter, which is four time slots in this preferred embodiment. When the restricted device is removed from the restricted area, it will not receive the control signal, and will not be muted. Use of another periodic frame structure, other than sending a frame every four frame times, does not significantly depart from the spirit of this invention. Sending frames in nonrepetitive manner which are not synchronized with each other, such as sending frames at random times but with a predetermined maximum time between frames, does not significantly depart from the spirit of this invention.

The following discussion pertains to transmitters at entrances 105 and transmitters at exits 106. These transmitters should generate distinct frame patterns that are different from the frame pattern 0x8d chosen for area-blanketing transmitters 100. The frame pattern 0xae is generated by entrance transmitters 105 and the frame pattern 0xe6 is generated by exit transmitters 105. Upon receipt of an entrance frame pattern 0xae, the receiver will be muted, until an exit frame pattern 0xec is received. However the exit transmitter 106 might be inoperable or the electronic device 101 might be taken out of the restricted area without passing through an exit. In this case, the device 101 may be automatically restored to its non-muted state after a period of time, such as three hours, after it has been muted by an entrance frame pattern 0xae. In fact, if the device 101 is automatically restored to its non-muted state after a period of time, and that period of time is predetermined and is deemed acceptable for the event taking place in the restricted area, an exit signal may not be needed. However, a different period of time than three hours, or the absence of a timeout period, or a period of time that is selectable by sending different entrance frame patterns, can be used without departing from the spirit of this invention. Moreover, there being two to the power eight, 256, different frame patterns, only a few of which might be generated by pest deterrents and other devices used in nonrestricted areas so they should not be used in this apparatus, many different frame patterns can be transmitted by entrance transmitters 105 to selectively mute either radio-frequency generation or audio generation or both, and to selectively mute for various time periods such as ten minutes, twenty minutes, half an hour, and so on, until the device returns automatically to a non-muted state, or muted indefinitely, until an exit signal returns the device to a non-muted state.

A preferred embodiment design of an area-blanketing transmitter (100) is shown in FIG. 4. Microcontroller 120 may be an inexpensive low-power microcontroller designed for battery use, such as the Motorola MMC2001. For the detailed preferred embodiment following in this specification, the Motorola MMC2001 Reference Manual (MMC2001RM/D) is incorporated by reference. Parallel port EPDR bit 0121 inputs a signal derived from household 110 volt 60 Hertz signal that is used to time the transmission of the control signal, and parallel port EPDR bit 1122 inputs a signal from a connector that can be used to synchronize the signal to be sent in a selected frame time. Serial port TxD0 is connected to a NOR gate 124 whose other input is the output of 555 timer chip 125 that generates a 40 KHz wave form. Output of NOR gate 124 is connected to an amplifier 126 that drives an ultrasonic transducer 127. When UART signal 123 is low, NOR gate 124 outputs a high signal, and transducer 127 generates a 40 KHz ultrasonic signal.

The C language declarations in FIG. 5 are included in the program for an area-blanketing transmitter (FIG. 6) and in the program for a receiver (FIG. 8). The first statement 129 indicates the location of I/O ports in the MMC2001; for instance the first declaration indicates a 16-bit port called EPDDR at location 0x10007002. The second statement 130 indicates constant values that may be combined and stored in I/O ports; for instance the first definition UART_EN=1 indicates a symbolic name UART_EN will have a value of 1.

C language procedures for the area-blanketing transmitter are shown in FIG. 5. Procedure init( ) 131 is executed just after the microcontroller is reset, to configure the I/O devices. Line 132, and the following four lines, initialize UART0 for 600 Baud transmission of 8-bit data frames with no parity and one stop bit (assuming the MMC2001 has a 32 MHz clock rate). Line 133 initializes the edge port to recognize rising edge signals on edge port pins. Procedure put( ) 134 is executed at least once every 60th of a second, but can be executed more often in a loop if the remaining programs running in the microcontroller execute a loop in less than a 60th of a second. A rising edge of the 60 Hz square wave sets bit zero of port EPFR. Line 135 causes the procedure to return to the calling program if an edge did not occur. Line 136 clears the bits in EPFR that had been set to 1. To cause a transmitter to synchronize to the current 60 Hz period, a pulse is applied via a connector to bit 1 of the EPFR device, setting it. If bit 1 of EPFR was set when bit zero became set, then the static local variable COUNT is cleared. COUNT is incremented; if COUNT is an integer multiple of four, the pattern 0x8d is written into the UART transmit register, causing pattern 0x8d (FIG. 2) to be sent out 137. Thus, a transmitter 100 broadcasts an area-blanketing signal once every four periods of a 60 Hz waveform, and each frame, having 8 data, no parity, and one stop bits at 600 baud, is equal to a 60 Hz period, so it does not interfere with a frame sent by another transmitter that is close to it.

A transmitter for an entrance 105 or a transmitter for an exit 106 can be implemented in similar manner to that described above. It need not be synchronized to other transmitters, however, and it may emit its frame pattern continuously, such that after one frame ends the same frame is sent again. By implementing transmitters for area-blanketing, entrance and exit, using the same microcontroller, a single device, suitably configured, can be used for each use. Indeed, a device first configured for an entrance can later be configured for an exit when an event is over.

A preferred embodiment design of a receiver and its connections to restricted device 101 is shown in FIG. 6. Microcontroller 140 may be an inexpensive low-power microcontroller such as the aforementioned Motorola MMC2001. Signal output of ultrasonic transducer 141 is amplified, filtered, and detected by analog hardware 142 which sends a digital signal to serial input port RxD0, 143. When a 40 KHz ultrasonic wave is detected by transducer 141 analog hardware 142 outputs a low digital signal. Parallel port EPDR bit 0 (144) outputs a signal which is applied to the sound generating or reproducing device 101 to mute it; when this signal is high, sound output is muted.

Unfortunately, a restricted device may completely be turned off when it is passed through an entrance or an exit, thereby making it unable to receive and process entrance and exit frames. However, microcontrollers such as the Motorola MMC2001 have low-power stop and doze modes, whereby the microcontroller, though turned off to conserve battery power, can be put in the run mode upon receipt of a signal such as the output of analog hardware 142. The microcontroller would be maintained in a stop or doze mode. Then it can be put into a run mode upon receipt of a signal from analog hardware 142 to respond to entrance and exit frames.

C language procedures for the receiver are shown in FIG. 8. Procedure inito 150 is executed just after the microcontroller is reset, to configure the I/O devices. Line 151, and the following four lines, initialize UART0 for 600 baud reception of 8-bit data frames with no parity and one stop bit (assuming the MMC2001 has a 32 MHz clock rate). Line 152 initializes the edge port to output a muting signal on edge port bit 0. Procedure check( ) 153 is executed slightly less often than every 15th of a second. UART frames that arrive in the meantime are stored in a hardware queue; each frame's data is read from this queue by reading a byte from port U0TX. Line 154 checks for the presence of a frame's data in the hardware queue. As long as there is data in the queue, line 155 reads the data. If the frame was received in error, nothing is done (line 155), otherwise if the area blanketing frame 0x8d is received, local variable i is set equal to 1 (line 156) to mute the electronic device, otherwise if the entrance frame 0xae is received, global variable timeout is set equal to constant N (157) to mute the electronic device for the next three hours, otherwise if the exit frame 0xe6 is received, global variable timeout is cleared (line 158) to restore the electronic device to its non-muted state. If timeout is nonzero, local variable i is set to 1 (line 160) to mute the electronic device. Local variable i is output into port EPDR, where a value of 1 mutes the restricted device (line 161). The variable timeout is periodically decremented. (The program segment for this periodic decrement function is not shown, there being several ways to do this, which are not important to this invention.) The value N (159) is selected such that, unless timeout is prematurely cleared, timeout will become zero in a predetermined time, which is three hours in this preferred embodiment. Thus, if any frame is received without error, having a pattern 0x8d that is sent by area-blanketing transmitter 100, the mute signal is asserted and the objectionable audio signal is not produced, and if any frame is received without error, having entrance pattern 0xae sent by transmitter 105, the mute signal is asserted and the objectionable audio signal is not produced for the next three hours, or until exit pattern 0xe6 is received.

Occasionally a need may arise to override the automatic mute control, for instance to permit an emergency telephone signal to ring the cell phone even though it is muted, or for instance to restore a device that is accidentally muted. However, overriding should not be so easy as to defeat the objective of this invention. A command should be able to be sent from a controlled source, such as a service department's telephone hot line, to override the mute control. Request authorization to override the muting capability should be administered by the service department so as to prevent users from flagrantly disabling the muting capability, yet handle valid exceptions to automatic control. A communication channel will send the command from the service center to the electronic device. In this preferred embodiment, a command may be sent on a cell phone channel. This message can be carried by a signal that is modulated using frequency-shift keying, which is also used in modems and faxes. The signal will be modulated using a UART frame structure, for reasons discussed earlier in this specification. Hardware and software for this preferred embodiment is similar to that for receiving control signals in a restricted device, as in FIG. 8. whereas the control signal receiver user UART device numbered zero, there is a second UART device, numbered one, with the same functionality as UART device numbered zero, that can be coupled through a modem device of known design to the cell phone's audio channel. So, in the interests of brevity, this hardware and software will not be further described in this specification. In order to make unauthorized generation or duplication of these commands somewhat more difficult, the electronic device's phone number and the current time will be sent in the commands, to prevent one command from disabling many devices or from being repeatedly used to disable the same device (the time sent in the command can be compared to the current time, which is maintained in most cell phones). At least a simple encryption technique will be used to make construction of these messages more difficult, such as appending a check sum to the end of the message which is the sum of all the bytes in the message. This can be used to foil counterfeiters of commands who are unskilled in the art of communication protocols. However, without departing from the spirit of this invention, any communication channel such as a regular telephone line or a pager channel can be used; the command may be sent on different carriers than frequency-shift keying, such as amplitude modulation; the command may be modulated using different communication frame structures; the command may be composed using different frame sequences; and the command may be secured using more powerful encryption techniques.

Two mechanisms may be used to restrict the use of control signal transmitters. In a first mechanism, a command may likewise be able to be sent from a controlled source, such as a service department's telephone hot line, through a communication channel to enable and configure a transmitter of control signals. Authorization to enable and configure a signal transmitter should be administered by the service department so as to limit the risk that a transmitter apparatus might be used mischievously or maliciously. In this preferred embodiment, a command may be sent on a telephone channel, carried by a signal that is modulated using frequency-shift keying, modulated using a UART frame structure, for reasons discussed earlier in this specification. Again, hardware and software for this preferred embodiment is similar to that for receiving control signals in a restricted device, as in FIG. 8. So, in the interests of brevity, it will not be further described in this specification. The command will contain a signal byte which will be transmitted by the transmitter receiving the command. In order to make unauthorized generation or duplication of these commands a bit harder, the transmitter should have a unique computer-readable serial number; the command will have this serial number and the current time, to prevent one command from being used to enable and configure other unauthorized transmitters or from being repeatedly used to enable the same transmitter, because the time can be compared to the current time that can be maintained in the transmitter. At least a simple encryption technique will be used to make construction of these commands more difficult, such as appending a check sum to the end of the message which is the sum of all the bytes in the message. This can be used to foil counterfeiters of commands who are unskilled in the art of communication protocols. However, without departing from the spirit of this invention, any communication channel such as a cell telephone line or a pager channel can be used; the command may be sent on different carriers than frequency-shift keying, such as amplitude modulation; the command may be modulated using different communication frame structures; the command may be composed using different sequences of frames, such as containing a range of serial numbers and a range of times, instead of a single serial number and a single time for which a command is valid; and the command may be secured using more powerful encryption techniques.

Alternatively, in a second mechanism, the transmitter can be enabled and configured by plugging into it a small cartridge, containing a removable non-volatile memory such as an electrically erasable programmable read-only memory (EEPROM). Such a cartridge has been commonly used to load games into personal computers or game players, and is similar to a "smart card" or magnetically recorded credit card. The techniques for programming such a non-volatile memory, and for connecting such a non-volatile memory to a transmitter device, are well-known to one skilled in the art. In this alternative preferred embodiment, a service department will write the EEPROM and mail it to the transmitter's user. Authorization to enable and configure a signal transmitter should be administered by the service department so as to limit the risk that a transmitter apparatus might be used mischievously or maliciously. The EEPROM will be read by the transmitter to enable and configure its control signals. The EEPROM will store a signal byte which will be transmitted by the control signal transmitter reading the EEPROM. In order to make unauthorized generation or duplication of these commands a bit harder, the transmitter should have a unique computer-readable serial number; the EEPROM will store this serial number and the current time, to prevent one EEPROM from being used to enable and configure other unauthorized transmitters or from being repeatedly used to enable the same transmitter, because the time can be compared to the current time that can be maintained in the transmitter. At least a simple encryption technique will be used to make construction of these EEPROMs more difficult, such as appending a check sum to the end of the message which is the sum of all the bytes in the message. This can be used to foil counterfeiters of commands who are unskilled in the art of construction of data records. However, without departing from the spirit of this invention, a read-only memory (ROM), a magnetic stripe, or alternative nonvolatile memory may be used in place of an EEPROM, the format of data in the card might be modified to contain, for instance, a series of dates and a range of serial numbers, for which authorization is given, and a more elaborate encryption code can be used.

An important aspect of this invention is its low cost. A restricted device can be modified by the modification of a cell phone mouthpiece to also receive the ultrasonic signals, or else by the addition of an ultrasonic transducer. Analog circuitry is also needed to amplify, filter, and detect the ultrasonic signal. The UART hardware may be on the microcontroller already, or can be added at low cost because UART designs are widely reproduced. The restricted device microcontroller's program need not be greatly expanded. Thus the hardware and software needed to implement this valuable function in receivers will not be expensive. Also, transmitters will similarly be inexpensive.

As opposed to a radio-interference device, this inventive apparatus does not jam a radio-frequency signal carrier. Unidirectional or bidirectional radio transmission may be still permitted, while objectionable audible or radio-frequency output is muted. As opposed to infrared remote controls, which mute television sets and similar home entertainment devices, this inventive apparatus broadcasts the same mute control signal from possibly more than one transmitter to all receivers. By contrast, infrared remote controls for T.V.s and stereos are designed, as much as possible, to control just one device from one transmitter, such that other devices ignore the control. Finally, this inventive device solves an onerous problem, as restricted devices are widely used and are expected to become even more widely used, which no other known apparatus attempts to solve.

Modifications to this invention can be made by one skilled in the art without departing from the spirit of the invention. Instead of sending the objectionable audio signal, while the signal is muted, an optional part of the apparatus can include automatic means to store the message being sent, as in voice-mail, or to inform the sender, by means of a special tone or sequence of tones, that the receiver is in a restricted area and cannot hear the sound. Another optional part of the apparatus can include a vibrator or other non-objectionable indicator that is automatically enabled instead of the objectionable audio sound, when the receiver is in a restricted area. Further, the objectionable audio signal may be reproduced or generated in the microcontroller's software. The muting operation can be implemented in software, rather than being done through a signal that is output from the microcontroller, as is illustrated herein. Or it can be implemented by a mechanical or electro-mechanical coupling. While the invention has been described in connection with an illustrative embodiment, obvious variations therein will be apparent to those skilled in the art without the exercise of invention, accordingly the invention should be limited only to the scope of the appended claims.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A system for restricting radio frequency transmissions of a cellular telephone within a restricted area comprising:
   i) a restricted area wherein all radio transmissions are restricted, that restricted area being either a fixed-location contiguous physical space, or a moving vehicle's interior contiguous physical space, where a cellular telephone might be operable;
   ii) a nonempty set of cellular telephones disposed within the restricted area, each cellular telephone including a radio frequency transmitter for transmitting, and a radio frequency receiver for receiving radiofrequency signals;
   iii) a radio frequency transmissions inhibitor, the radio frequency transmissions inhibitor being capable of selectively disabling the radio frequency transmissions of a first selected subset of the plurality of cellular telephones, this selective disabling being directly responsive, at least in part, to whether or not the cellular telephone is in the restricted area; and
   iv) an emergency override, the emergency override capable of selectively enabling the radio frequency transmissions of a second selected subset of the plurality of cellular telephones, wherein if a cellular telephone is a member of the first selected subset and a member of the second selected subset, the cellular telephone's radio frequency transmissions are enabled.

2. The system of claim 1, wherein the inhibitor, or emergency override, or both, communicate using
   i) a control-signal transmitter disposed within the restricted area;
   ii) a control-signal receiver disposed within the plurality of cellular telephones; and
   iii) a control signal generated by the transmitter and received by the receiver, the signal either inhibiting or allowing radio frequency transmissions from a subset of the plurality of cellular telephones.

3. The system of claim 2, wherein the control-signal receiver is separate from the radio frequency receiver.

4. The system of claim 3, wherein the control-signal receiver is selected from the group of an ultrasonic receiver and an infrared receiver.

5. The system of claim 2, wherein the control-signal transmitter is selected from the group of an ultrasonic transmitter and an infrared transmitter.

6. The system of claim 2, wherein the control-signal is received by all of the plurality of cellular telephones, and wherein each of the plurality of cellular telephones further comprises decoding circuitry for decoding an address stored within the signal to determine whether the particular cellular telephone is allowed to transmit radio frequency transmissions.

7. The system of claim 1, wherein the radio frequency transmissions inhibitor is disposed within the restricted area.

8. The system of claim 1, wherein the restricted area has at least one entrance and wherein the radio frequency transmissions is disposed at the least one entrance.

9. The system of claim 1, wherein each of the plurality of cellular telephones further comprises emergency override circuitry coupled to the radio-frequency receiver and the radio frequency transmitter, and wherein an emergency override command is received at least in part by the radiofrequency receiver, and wherein the emergency override circuitry activates the radio frequency transmitter.

10. A system for restricting the ringing of a cellular telephone within a restricted area comprising:
    i) a restricted area wherein ringing of all cellular telephones disposed within the restricted area is muted, that restricted area being either a fixed-location contiguous physical space, or a moving vehicle's interior contiguous physical space, where a cellular telephone might be operable;
    ii) a a nonempty set of cellular telephones disposed within the restricted area, each cellular telephone including a radio frequency receiver for receiving radio-frequency signals and a ringer;
    iii) a ring inhibitor, the ring inhibitor capable of selectively disabling ringing in a first selected subset of the plurality of cellular telephones, this selective disabling being directly responsive, at least in part, to whether or not the cellular telephone is in the restricted area; and
    iv) an emergency override, the emergency override capable of selectively enabling ringing of a second selected subset of the plurality of cellular telephones, wherein if a cellular telephone is a member of the first selected subset and a member of the second selected subset, the cellular telephone's ringing is enabled.

11. The system of claim 10, wherein the ring inhibitor, emergency override, or both, communicate using:
    i) a control-signal transmitter disposed within the restricted area;

ii) a control-signal receiver disposed within the plurality of cellular telephones; and iii) a control signal generated by the transmitter and received by the receiver, the signal either inhibiting or allowing ringing from a subset of the plurality of cellular telephones.

12. The system of claim 11, wherein the control-signal receiver is separate from the radio frequency receiver.

13. The system of claim 12, wherein the control-signal receiver is selected from the group of an ultrasonic receiver and an infrared receiver.

14. The system of claim 11, wherein the control-signal transmitter is selected from the group of an ultrasonic transmitter and an infrared transmitter.

15. The system of claim 11, wherein the control-signal is received by all of the plurality of cellular telephones, and wherein each of the plurality of cellular telephones further comprises decoding circuitry for decoding an address stored within the signal to determine whether the particular cellular telephone is allowed to ring.

16. The system of claim 10, wherein the ring inhibitor is disposed within the restricted area.

17. The system of claim 10, wherein the restricted area has at least one entrance and wherein the ring inhibitor is disposed at the least one entrance.

18. The system of claim 10, wherein each of the plurality of cellular telephones further comprises emergency override circuitry coupled to the radio-frequency receiver and the ringer, and wherein an emergency override command is received at least in part by the radio-frequency receiver, and wherein the emergency override circuitry activates the ringer.

* * * * *